(12) United States Patent
Ohtsuka

(10) Patent No.: US 6,496,611 B1
(45) Date of Patent: Dec. 17, 2002

(54) MULTICHANNEL OPTICAL SPECTRUM SLICER AND METHOD OF MEASURING MODAL BIREFRINGENCE AND/OR POLARIZATION MODE DISPERSION OF SLICER ITSELF

(75) Inventor: Yoshihiro Ohtsuka, Yokohama (JP)

(73) Assignee: Moritex Corporation, Tokyo (JP)

( * ) Notice: Subject to any disclaimer, the term of this patent is extended or adjusted under 35 U.S.C. 154(b) by 92 days.

(21) Appl. No.: 09/651,881

(22) Filed: Aug. 30, 2000

(30) Foreign Application Priority Data

Sep. 3, 1999 (JP) .......................... 11-250742

(51) Int. Cl.$^7$ .............................................. G02B 6/00
(52) U.S. Cl. ......................... 385/11; 359/497; 359/498
(58) Field of Search ................... 385/11; 359/483–502; 356/364, 365

(56) References Cited

U.S. PATENT DOCUMENTS

| | | | | |
|---|---|---|---|---|
| 4,129,357 A | * | 12/1978 | Title | 359/497 |
| 4,247,166 A | * | 1/1981 | Yeh | 359/484 |
| 4,500,178 A | * | 2/1985 | Yeh | 359/498 |
| 4,548,479 A | * | 10/1985 | Yeh | 359/498 |
| 4,678,287 A | * | 7/1987 | Buhrer | 359/498 |
| 5,191,392 A | * | 3/1993 | Johnson | 356/365 |
| 5,825,492 A | * | 10/1998 | Mason | 356/491 |

FOREIGN PATENT DOCUMENTS

JP  10303822  11/1998

\* cited by examiner

Primary Examiner—Hemang Sanghavi
Assistant Examiner—Scott Knauss
(74) Attorney, Agent, or Firm—Greenblum & Bernstein P.L.C.

(57) ABSTRACT

A multichannel optical spectrum slicer is able to convert a broad-band continuous spectral light into discontinuous multiple wavelength lights.

This spectrum silcer comprise a birefringent device ($F_1$) and linear polarizers ($P_0$, $P_1$). A birefringent device ($F_1$) such as a birefringent single-mode optical fiber or uniaxial single crystal has two polarization axes (x, y) each orthogonal to an optical axis (z). Linear polarizers ($P_0$, $P_1$) are disposed at the input and the output ends of the birefringent device ($F_1$) with the direction of polarization (A) being inclined by about 45° relative to each of the polarization axes (x, y).

Further, when birefringence devices ($F_1$, $F_2$) are disposed in plurality between each polarizer ($P_0$–$P_2$), the spectrum separation is enhanced more.

6 Claims, 3 Drawing Sheets

MULTICHANNEL OPTICAL SPECTRUM SLICER AND METHOD OF MEASURING MODAL BIREFRINGENCE AND/OR POLARIZATION MODE DISPERSION OF SLICER ITSELF

BACKGROUND OF THE INVENTION

1. Field of the Invention

The present invention concerns a multichannel optical spectrum slicer for outputting discontinuous multichannel lights of different wavelengths or multiple wavelength lights from a broad band continuous spectrum source having a wavelength region of a predetermined range, which is suitable as a light source for inspection and evaluation of optical parts, devices and systems in the wavelength division multiplexer for use in optical communications systems.

2. Statement of the Related Art

In optical communication using optical fibers as signal transmission lines, TDM(time division multiplexing) transmission has been conducted so far with an aim of higher bit-rate transmission of a great amount of information and, recently, WDM(wavelength division multiplexing) transmission has been noted for transmitting a further great amount of information along with popularization of internets.

The WDM transmission is a mode for multiplex transmission of a plurality of light signals of different wavelengths by way of a single optical fiber. Optical signals from light sources of different wavelength are synthesized by an optical multiplexer into a single optical fiber on the transmission side, while an optical signal from the optical fiber is separated on every wavelength by an optical demultiplexer and convert the same into electric signals by a photoreceiving device on the receiving side.

In this constitution, a plurality of signals independent of each other can be transmitted by using a single optical fiber, to provide advantages capable of bilateral transmission, transmitting different kinds of signals such as analog signals and digital signals simultaneously, and transmitting signals at high speed and of large capacity while dividing them into channels each at low speed and of small capacity.

By the way, for conducting the WDM transmission, a light source device for outputting light at a predetermined wave length has been obtained mainly by controlling the wavelength of a laser light source or transmitting a light outputted from an light emission diode through an interference filter to selectively take out a light at a desired wavelength.

However, since any of the light sources described above can output only the light at a single wavelength, when a plurality of lights of different wavelengths are intended to be multiplexed, light sources are required by the number of channels, to increases the cost.

In the WDM transmission, it is desirable to increase the density by setting the wavelength spacing between each of transmission lights to 1 nm or less (typically 50 and 100 GHz by frequency spacing).

However, even when the laser light sources are used by the number corresponding to the number of channels, it is practically difficult to control the wavelength of each laser light at a high accuracy and output discontinuous multiple wavelength lights with a spacing of 1 nm or less between each of adjacent lights.

Further, since the interference filter for use in high DWDM(dense wavelength division multiplexing) transmission has a multi-layered structure of 50 to 100 layers, it is extremely difficult to design and manufacture the filter such that discontinuous multiple wavelength lights can be outputted with the wavelength spacing of 1 nm or less between each of adjacent lights by controlling the thickness for each of the layers.

Furthermore, in the WDM transmission, it is important that spectrums of multiple wavelength lights do not overlap with each other in a state where the lights of different wavelengths are synthesized or separated such that lights of wavelengths adjacent with each other cause no cross-talk.

As another subject, since lights of various wavelengths transmit through optical parts, devices and systems in the WDM optical communication, it is necessary to previously recognize the optical characteristics of them to all of such wavelengths and this may be confirmed by entering discontinuous multiple wavelength lights having a desired wavelength spacing to the optical parts, devices and systems and detecting the characteristic of emission light.

OBJECT OF THE INVENTION

In view of the above, it is a first technical subject of the present invention to provide a multichannel optical spectrum slicer capable of outputting discontinuous multiple wavelength lights having a desired wavelength spacing from a broad band continuous spectral source in a simple structure and at a reduced cost without using special light sources or filters.

A second object of the present invention is to enable easy measurement for modal birefringence and/or polarization mode dispersion of a birefringent device used for such channel optical spectrum slicer.

SUMMARY OF THE INVENTION

For solving the subject, the present invention provides a multichannel optical spectrum slicer for converting a light incident from a broad band continuous spectrum light source having an optional wavelength region into discontinuous multiple wavelength lights, and outputting the same, comprising:

a birefringent device such as a birefringent single-mode optical fiber or uniaxial single crystal member having two polarization axes each orthogonal to an optical axis (z) and linear polarizers disposed at the light incident end and the light emission end of the birefringent device with the direction of polarization being inclined by about 45° relative to each of polarization axes.

According to the invention, when a broad band continuous spectral source having an optical wavelength region transmits the linear polarizer on the incident side, it is converted into linearly polarized lights each in 45° direction and entered to the birefringent device to form a light polarized along axis x (x-polarized light) and a light polarized along axis y (y-polarized light) each transmitting along the optical axis, in which the light intensity is identical between both of the polarized light components.

Since the refractive indexes $n_x$ and $n_y$ of the birefringent device are different with respect to the two polarization axes, a difference in the velocity is caused between the x-polarized light and the y-polarized light to form a phase difference at the emission end.

Accordingly, when the lights transmit the linear polarizer on the emission side, 45° components of the x-polarized light and the y-polarized light are synthesized, and the identical spectral components interfere with each other, so that a comb type spectrum of the discontinuous multiple wavelength light is observed in the spectral region by wavelength scanning of the emission light by a spectral analyzer or the like.

Modal birefringence $\Delta n = n_x - n_y$ of the birefringent device can be determined by the following equation, assuming the frequency spacing between adjacent spectrums of the observed discontinuous multiple wavelength lights as $v_p$ and the known length of the birefringent device as $L_0$:

$$\Delta n(v) = c / \{v_p(v) \cdot L_0\}$$

Further, the polarization mode dispersion PMD of the birefringent device can be determined correctively by using the modal birefringence $\Delta n$ as:

$$PMD = d\Delta\beta/d\omega$$
$$= \Delta n(v)/c + (v/c)\{d\Delta n(v)/dv\}$$
$$\Delta\beta = 2\pi v \cdot \Delta n(v)/c$$
$$\omega = 2\pi v$$

Then, discontinuous multiple wavelength lights with a predetermined frequency spacing $v_p$ can be outputted by using a birefringent device made of the identical material and setting the length $L = c/(\Delta n \cdot v_p)$, based on the thus determined modal birefringence $\Delta n$.

DESCRIPTION OF THE ACCOMPANYING DRAWINGS

DESCRIPTION OF PREFERRED EMBODIMENTS

Preferred embodiments of the present invention are to be explained in details with reference to the drawings.

Figure 1:
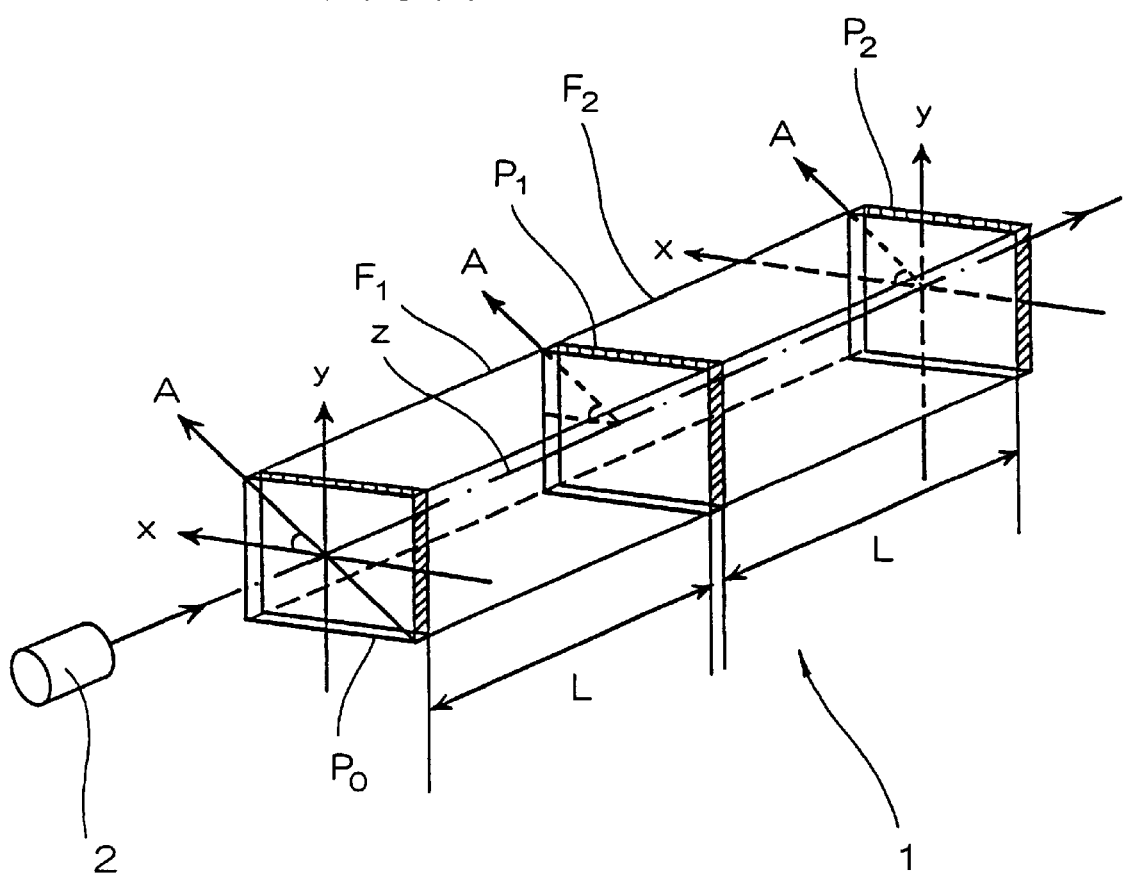
FIG. 1 is an explanatory view showing a multichannel optical spectrum slicer according to the present invention.

A multichannel optical light spectrum slicer 1 shown in FIG. 1 is adapted so as to output discontinuous multiple wavelength lights from the light emission end when a light having an optional wavelength region is entered from a broad band spectrum light source 2, and the optical spectrum slicer 1 comprises birefringent devices $F_1$ and $F_2$ each having two polarization axes x and y each orthogonal to an optical axis z and linear polarizers $P_0$–$P_2$ each disposed at the incident end and the emission end of each of the birefringent devices $F_1$ and $F_2$.

Each of the linear polarizers $P_0$–$P_2$ is disposed such that the polarized light axis A forms an angle of 45° relative to each polarization axis x, y.

In this constitution, when the light transmits through the linear polarizers $P_0$ and $P_1$ disposed at the incident end for each of the birefringent devices $F_1$ and $F_2$ and enters along the optical axis z into the birefringent devices $F_1$ and $F_2$, the intensity of light is identical between the x-polarized light and the y-polarized light.

Further, the x-polarized light and the y-polarized light emitted from the birefringent devices $F_1$ and $F_2$, respectively, transmit through the polarizers $P_1$ and $P_2$ disposed on the emission end, so that 45° components are synthesized to each other and identical spectral components interfere to each other.

For the broad band continuous spectral light source 2, those capable of outputting a light having a sufficiently wide range of frequency, for example, ASE (Amplified Spontaneous Emission) light source or an SLD light source is used.

For the birefringent devices $F_1$ and $F_2$, birefringent single-mode optical fibers such as stress induced birefringence single mode optical fiber or uniaxial single crystal member such as rutile or quartz crystals are used.

The length L for each of the birefringent devices $F_1$ and $F_2$ is formed equal and it has the following relation with the frequency spacing $v_p$ of the discontinuous multiple wavelength lights to be outputted:

$$L = c/(\Delta n \cdot v_p) \quad (1)$$

L: length of birefringent device [m]

c: velocity of light in vacuum ($3 \times 10^8$[m/s])

$V_p$: frequency spacing [Hz]

$\Delta n$: modal birefringence
  (= refractive index $n_x$ of polarization axis x – refractive index $n_y$ of polarization axis y).

This invention has a constitution, for example, as described above and the operation thereof is to be explained.

At first, the length L for the birefringent devices $F_1$, $F_2$ is determined in accordance with the frequency spacing $v_p$ for the discontinuous multiplex wavelength lights to be outputted.

In this case, the length for the birefringent devices $F_1$ and $F_2$ can be determined in accordance with the equation (1) if the modal birefringence $\Delta n$ is known.

If the modal birefringence $\Delta n$ is unknown, the modal birefringence $\Delta n$ of the birefringent devices $F_1$, $F_2$ is calculated by a multichannel optical spectrum slicer in which linear polarizers $P_0$, $P_1$ are disposed at the incident end and the emission end of the birefringent devices $F_1$ of a length $L_0$.

The modal birefringence $\Delta n$ is expressed by modifying the equation (1) as:

$$\Delta n = c/(v_p \cdot L_0) \quad (2)$$

and can be calculated based on the frequency spacing $v_p$ of the spectrum of the interference light outputted from the multiple optical spectrum slicer.

Further, when rutile ($TiO_2$) is used for the birefringent devices $F_1$, $F_2$, since it is known that $\Delta n = 0.26$, when a discontinuous multiple wavelength lights with a frequency spacing $v_p$ of 125 GHz (about 1 nm by wavelength spacing) are intended to be outputted, the length for the birefringent devices $F_1$ and $F_2$ is calculated in accordance with the equation (1) as:

$$L = c/(\Delta n \times v_p)$$
$$= 3 \times 10^8 / (0.26 \times 125 \times 10^9)$$
$$= 0.009 \text{ [m]} = 9 \text{ [mm]}$$

Further, if the modal birefringence Δn can be found the polarization mode dispersion PMD can be determined in accordance with the following equation:

$$PMD = \Delta n/c + (v/c)(d\Delta n/dv) \quad (3)$$

c: velocity of light in vacuum ($3 \times 10^8$ [m/s])

v: frequency of light [Hz]

In this case, since the second term of the equation is negligible providing that the Δn dose not change so greatly depending on the wavelength in the vicinity of v=1.3 (μm), the polarization mode dispersion PMD can be calculated, for example, in accordance with the equation (3) as:

$$PMD = \Delta n/c$$
$$= 0.26/(3 \times 10^8)$$
$$\approx 8.6 \text{ (ns/m)}$$

Further, when a birefringent single-mode optical fiber with modal birefringence $\Delta n = 5 \times 10^{-4}$ is used for the birefringent devices $F_1$ and $F_2$ and a light with the frequency spacing $v_p = 125$ GHz is intended to be outputted, the length L for each of the birefringent devices $F_1$ and $F_2$ is calculated in accordance with the equation (1) as:

$$L = c/(v_p \times \Delta n)$$
$$= 3 \times 10^8/(125 \times 10^9 \times 5 \times 10^{-4})$$
$$\approx 4.8 \text{ [m]}$$

When a broad band continuous spectral light is entered from the light source 2 to the multichannel optical spectrum slicer 1 designed as described above, lights having frequency components transmit the linear polarizer $P_0$ to form linear polarized lights each at a direction of 45° relative to each of polarization axes x and y of the birefringent device $F_1$, in which the light intensity is identical between both of the polarized light components.

The refractive indexes $n_x$ and $n_y$ of the polarized light axes x and y of the birefringent device $F_1$ are different from each other and when a specified spectral component of the incident light is noted, for example, in a case $n_x < n_y$, since the velocity of light proceeding along the polarized light axis x is higher than the velocity of the light proceeding along the polarized axis y, a phase difference is caused between two lights outputted from the birefringent device $F_1$.

That is, when lights having an identical spectral region are entered to the polarized light axes x and y of the birefringent device $F_1$, lights having a plurality of spectral components with phase difference are emitted from the emission end of the birefringent device $F_1$.

Then, when the plurality of lights transmit the linear polarizer $P_1$, the polarized components at 45° direction are synthesized and interfere with each other and then emitted as discontinuous multiple wavelength lights each spaced by a predetermined wavelength.

Figure 2:
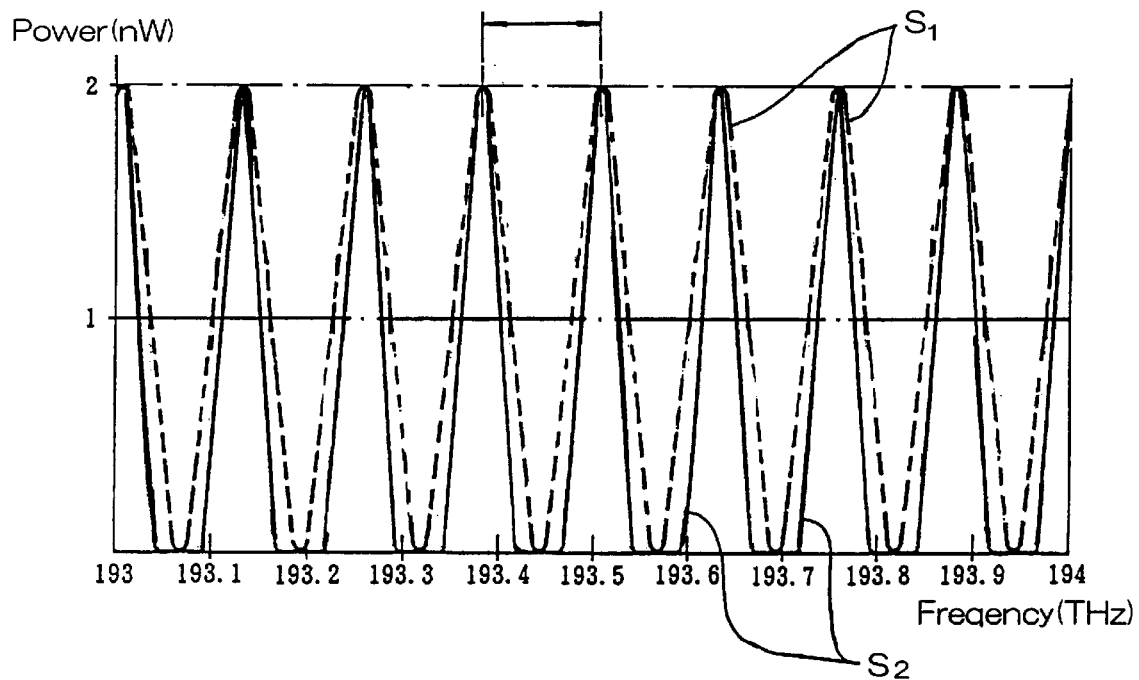
FIG. 2 is a graph showing a theoretical value for the spectral filter characteristic obtained by dividing the output spectrum of the emission light from the multichannel optical spectrum slicer with an input broad band continuous spectrum.

The spectral filter characteristic obtained by dividing the output spectrum of the emission light with the input broad band continuous spectrum forms a comb type spectrum as shown by dotted lines $S_1$ in FIG. 2.

This shows that discontinuous multiple wavelength lights each at a predetermined frequency spacing (wavelength spacing) are outputted.

Then, when the discontinuous multiple wavelength lights emitted through the linear polarizer $P_1$ are further entered to the birefringent device $F_2$ and transmitted through the linear polarizer $P_2$ disposed at the emission end thereof, the spectral filter characteristic obtained by dividing the output spectrum of the emission light with the input broad band continuous spectrum forms a comb type spectrum with the wavelength spacing identical with that of the emission light from the birefringent device $F_1$ as shown by solid lines $S_2$ in FIG. 2, in which the waveform is further sharpened and the spectrum separation is enhanced more near the 0 level.

Accordingly, cross-talk between the spectrums is further decreased.

It can thus be seen that the wavelength spacing (frequency spacing) in the discontinuous multiple wavelength lights is decided by the light transmitting the first birefringent device $F_1$. Subsequently, since the waveform is sharpened on every passage of the birefringent devices and, since the spectrum separation is enhanced more near the 0 level, it provides a merit capable of decreasing the cross-talk upon wave separation and synthesis.

Figure 3:
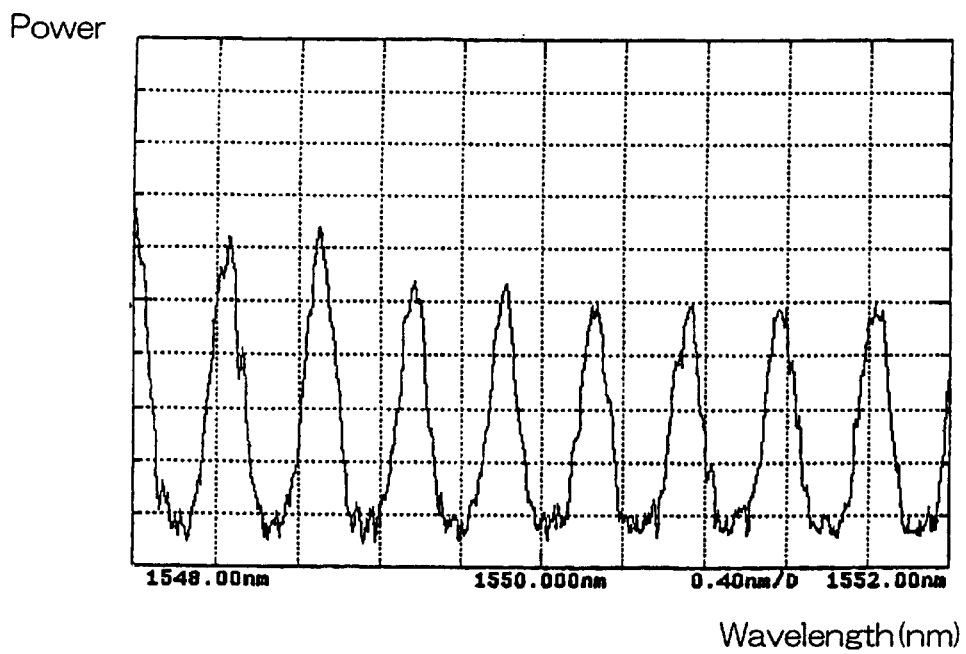
FIG. 3 is a graph showing an output spectrum of multiple wavelength lights emitted actually by using two rutiles at a length: L=2 cm as a birefringent device.

FIG. 3 shows an output spectral of discontinuous multiple wavelength lights outputted from the multichannel optical spectrum slicer 1 shown in FIG. 2, using two rutiles of 2 cm in length as the birefringent device $F_1$, $F_2$.

In this embodiment, multiple wavelength lights with a wavelength spacing of 0.45 nm (corresponding to frequency spacing of 56 GHz) are outputted and it can be seen that the waveform is close to the theoretical value shown by solid lines $S_2$ in FIG. 2.

Since the thus obtained light forms discontinuous multiple wavelength lights containing a number of lights of different wavelengths each at a frequency spacing (wavelength spacing), a high density wavelength multiplexing communication can be conducted by amplifying such lights, branching them into lights at each of wavelength by using an array waveguide type diffraction grating or the like, modulating each of the lights by an external modulator into signal lights and then again synthesizing and transmitting them.

In this case, since the discontinuous multiple wavelength lights form a comb type spectrum with no cross-talk, the lights can be separated easily to such an extent that lights with adjacent wavelengths cause a little cross-talk to each other.

The present invention has been explained in the foregoings to a case of using two birefringent devices $F_1$ and $F_2$, but the present invention is not restricted only to such an embodiment but the number of the devices may be less than or more than two.

In a case of measuring the modal birefringence Δn and/or the polarization mode dispersion PMD of the birefringent device with such factors being unknown, it is desirable to calculate the factor based on a comb type spectrum outputted from a multichannel optical spectrum slicer formed by using only one birefringent device.

Figure 4:
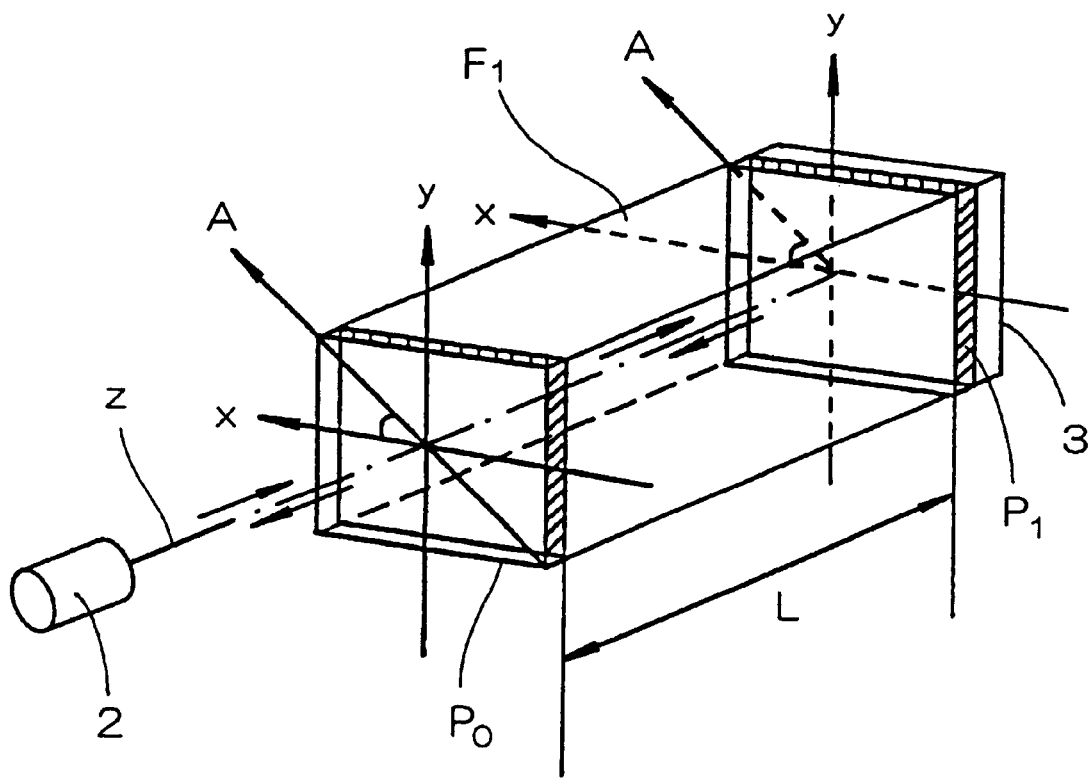
FIG. 4 is a explanatory view showing another embodiment.

Further, according to another embodiment shown in FIG. 4, only one birefringent device $F_1$ may be used, in which a reflection mirror 3 is disposed for reflecting the light transmitting the linear polarizer $P_1$ disposed on the emission end entering the reflected light again into the birefringent device $F_1$ and then emitting it from the side of the linear polarizer $P_0$. This arrangement can provide the same result as in the case of serially arranging the two birefringent devices $F_1$ and $F_2$.

In this case, since the light transmits through one birefringent device 1 twice reciprocating in the birefringent device $F_1$, the output spectrum of the emission light is identical with the waveform shown by fine lines $S_2$ in FIG. 2 like that a case where the light passes through the two birefringent devices $F_1$ and $F_2$ shown in FIG. 1.

As described above, use of the reflection mirror 3 can provide a merit of saving the number of the birefringent devices to one-half and shortening the entire length of the device compared to the case of arranging the two birefringent devices $F_1$ and $F_2$ so as to emit the light entered from one end from the other end.

In summary, in a case of measuring modal birefringence Δn and/or polarization mode dispersion PMD, it is preferred to use a multichannel optical spectrum slicer having only one birefringent device as an object of measurement and, in a care of utilizing the outputted discontinuous multiple wavelength lights for wavelength division-multiplexing communication, it is preferred also, for preventing crosstalk, to use a multichannel optical spectrum slicer having a plurality of birefringent devices or only one birefringent devices with attachment of a reflection mirror at one end to reciprocate the light in the device.

The present invention can provide excellent effects capable of outputting discontinuous multiple wavelength lights having a desired spectral spacing in a device of a simple structure and a reduced cost without using special laser light sources or filters, and easily measuring modal birefringence and/or the polarization mode dispersion by utilizing the light.

The present disclosure relates to subject matter contained in priority Japanese Patent Application No. 250,742/1999 filed on Sep. 3, 1999, the contents of which is herein expressly incorporated by reference in its entirety.

What is claimed is:

1. A multichannel optical spectrum slicer for converting a light incident from a broad band continuous spectral light source having an optional wavelength region into discontinuous multiple wavelength lights, comprising:

at least one birefringent device having two polarization axes each orthogonal to an optical axis; and linear polarizers, disposed at the light incident end and the light emission end of the at least one birefringent device with the direction of polarization being inclined by about 45° relative to each of the polarization axes of the at least one birefringent device;

wherein the length of the at least one birefringent device has a frequency spacing of the discontinuous multiple wavelength lights to be output and is defined as:

$$L=c/(v_p\cdot\Delta n), \text{ where}$$

L: length of birefringent device
c: velocity of light in vacuum
$v_p$: frequency spacing
Δn: modal birefringence, where
Δn=refractive index $n_x$ of polarization axis x−refractive index $n_y$ of polarization axis y.

2. A multichannel optical spectrum slicer as defined in claim 1, wherein the at least one birefringent device is disposed along the optical axis and said linear polarizers are disposed at the light incident end and the light emission end of each at least one birefringent device, respectively.

3. A multichannel optical spectrum slicer for converting a light incident from a broad band continuous spectral light source having an optional wavelength region into discontinuous multiple wavelength lights, comprising:

a birefringent device having two polarization axes each orthogonal to an optical axis;

linear polarizers disposed at the light incident end and the light emission end of the birefringent device with the direction of polarization being inclined by about 45° relative to each of the polarization axes of the birefringent device; and a reflection mirror that reflects a light from the linear polarizer disposed on the emission end of the birefringent device and enters the reflected light again into the birefringent device.

4. A method of measuring modal birefringence and polarization mode dispersion of a birefringent device, the modal birefringence (Δn) and the polarization mode dispersion (PMD) of a birefringent device having two polarization axes each orthogonal to an optical axis, the modal birefringence and polarization mode dispersion being expressed as:

$$\Delta n(v)=c/(v_p\cdot L_0)$$

$$PMD=\Delta n/c+(v/c)\,(d\Delta n/dv), \text{ where}$$

c: velocity of light in vacuum
$v_p$: frequency spacing between adjacent spectrums
v: frequency of light
$L_0$: known length of birefringent device the method comprising:

entering a broad band continuous spectral light having an optional wavelength region to a multichannel optical spectral slicer in which linear polarizers with a direction of polarization being inclined by about 45° relative to each of the polarization axes are disposed at the light incident end and the light emission end of the birefringent device, determining the modal birefringence of the birefringent device based on the frequency spacing of the spectrum of the interference light outputted from the multichannel optical spectrum slicer, and determining the polarization mode dispersion based on the determined modal birefringence.

5. A method of measuring modal birefringence of a birefringent device, the modal birefringence of a birefringent device having two polarization axes each orthogonal to an optical axis, the modal birefringence being expressed as:

$$\Delta n(v)=c/(v_p\cdot L_0)$$

c: velocity of light in vacuum
$v_p$: frequency spacing between adjacent spectrums
v: frequency of light
$L_0$: known length of birefringent device the method comprising:

entering a broad band continuous spectral light having an optional wavelength region to a multichannel optical spectral slicer in which linear polarizers with a direction of polarization being inclined by about 45° relative to each of the polarization axes are disposed at the light incident end and the light emission end of the birefringent device, determining the modal birefringence of the birefringent device based on the frequency spacing of the spectrum of the interference light outputted from the multichannel optical spectrum slicer.

6. A method of measuring modal birefringence and polarization mode dispersion as defined in claim 4, wherein the modal birefringence and/or the polarization mode dispersion of the birefringent device are determined based on the frequency spacing of the spectrum of the interference light outputted from the multichannel optical spectrum slicer in which a reflection mirror is positioned for reflecting light from the linear polarizer disposed on the emission end of the birefringent device and entering the light again into the birefringent device.

\* \* \* \* \*